United States Patent [19]

Blomquist

[11] 4,026,191

[45] May 31, 1977

[54] MACHINE TOOL

[75] Inventor: Robert E. Blomquist, Rockford, Ill.

[73] Assignee: Sundstrand Corporation, Rockford, Ill.

[22] Filed: Nov. 17, 1975

[21] Appl. No.: 632,514

[52] U.S. Cl. .............................................. 90/11 D
[51] Int. Cl.$^2$ ........................................ B23C 1/00
[58] Field of Search .......... 90/11 R, 11 D, DIG. 28, 90/11 A; 51/166 MH, 168; 408/126, 239 A, 14

[56] References Cited

UNITED STATES PATENTS

| | | | |
|---|---|---|---|
| 3,136,217 | 6/1964 | Swanson et al. | 90/11 A |
| 3,198,079 | 8/1965 | Winnen | 90/11 A |
| 3,580,135 | 5/1971 | Jones | 90/11 A |
| 3,762,271 | 10/1973 | Poincenot | 408/239 A |

FOREIGN PATENTS OR APPLICATIONS

| | | | |
|---|---|---|---|
| 1,904,983 | 2/1969 | Germany | 90/11 A |
| 852,459 | 10/1960 | United Kingdom | 408/239 A |

*Primary Examiner*—Harrison L. Hinson
*Attorney, Agent, or Firm*—Wegner, Stellman, McCord, Wiles & Wood

[57] ABSTRACT

A machine tool having a head with a rotatable spindle including an extensible bar for holding a tool and which is axially movable between fully retracted and fully extended positions with several intermediate additional machining positions established by selectively operable stops. Large diameter tools with a flange and mounting taper (as may be provided by a tool adapter which mounts the tool) may be used with complete fit of the mounting taper with a spindle taper, and backup support of the tool at the flange thereof. The machine tool includes a rotatable but axially fixed bar carrier engageable with the tool flange for holding of the flange in fixed position. Axially outward movement of the spindle bar brings the tapers into complete fit while the tool flange is held in fixed position against the bar carrier, and this avoids the need for precision tolerances between the taper gauge line and the back of the flange.

13 Claims, 7 Drawing Figures

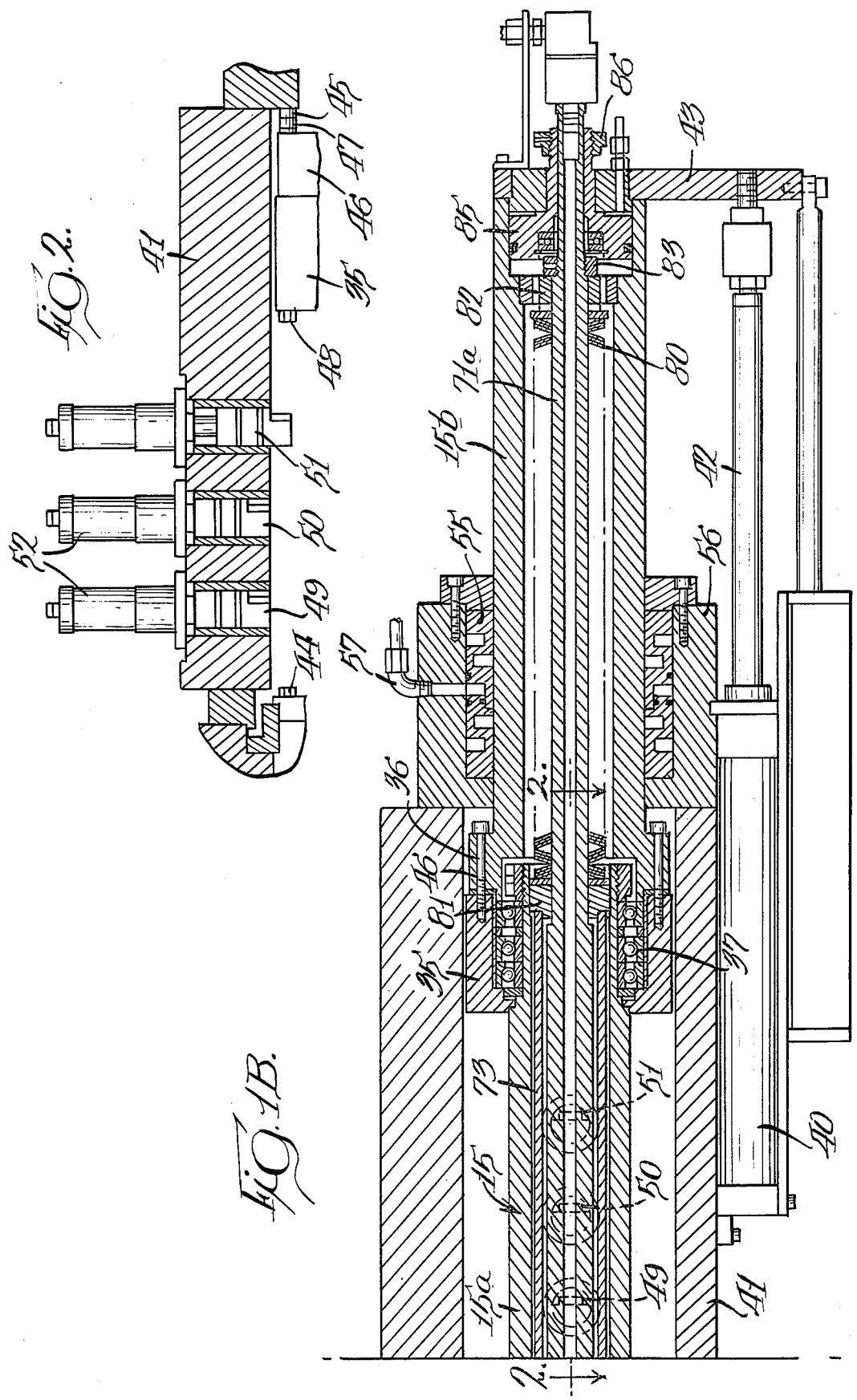

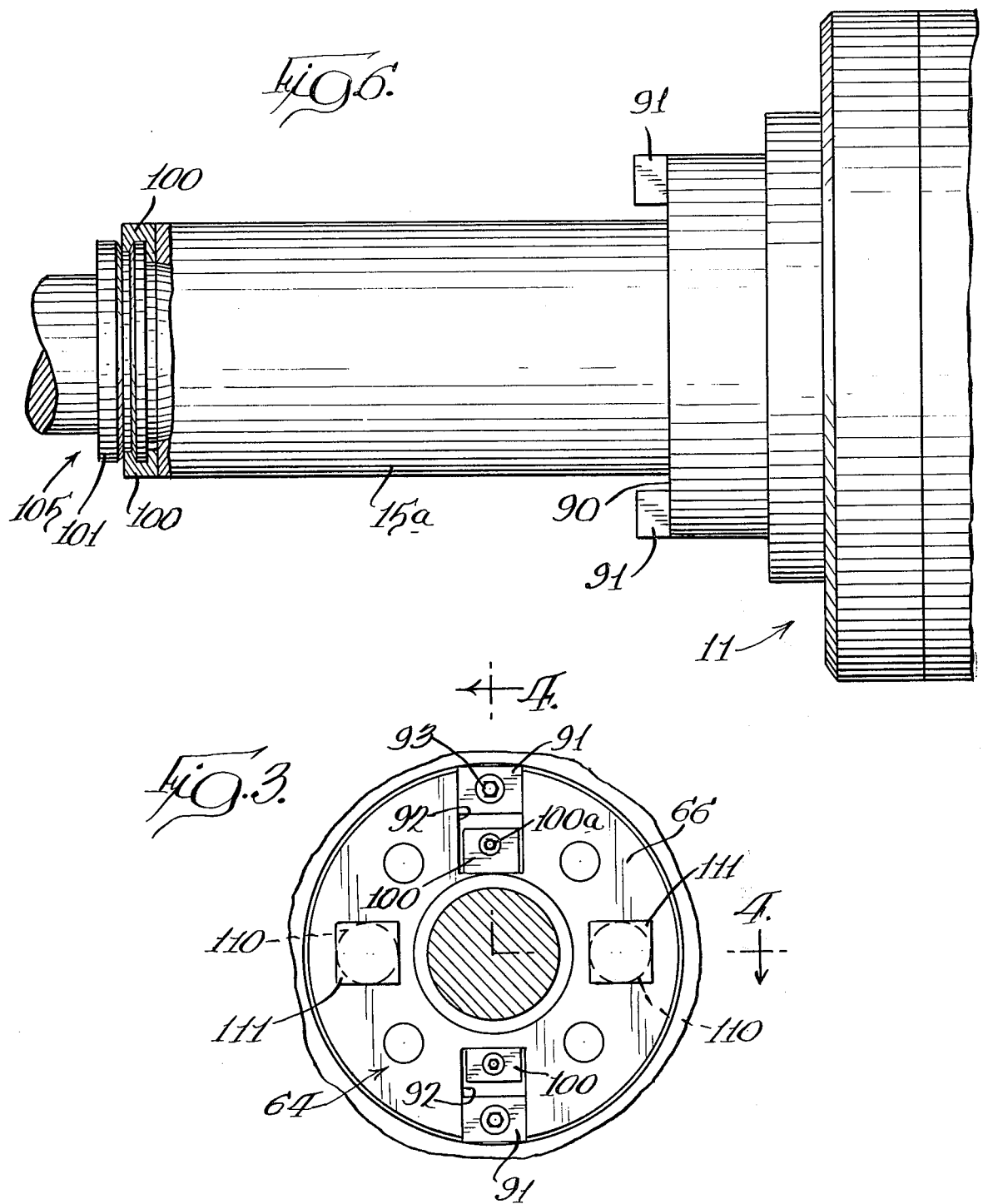

MACHINE TOOL

BACKGROUND OF THE INVENTION

This invention pertains to a machine tool having structure for backing up a tool on a reasonably large diameter for better operation while, at the same time, assuring a firm and complete fit between the taper of the tool and the spindle and a fit between the tool flange and the backup support for the tool. Additionally, the invention pertains to structure in a bar type machine wherein the bar can be extended to various operating positions for machining with small tools as well as having a retracted machining position where backup support for the large or extended length tool is provided.

Many machine tools have a spindle with a universally accepted taper, commonly known as an NMTBA (National Machine Tool Builders Association) taper, to receive a matching taper on a tool or tool adapter for locking the tool to the spindle in concentric relation therewith. When the machine tool is to use large cutters or extended length cutters, these tools can become much stiffer, effectively, if backed up on a reasonably large diameter. There is than the requirement that the tapers achieve a close fitting relation and, additionally, that a flange on a large tool, or a tool adapter carrying such tool, engage against a backup support to provide the stiffening of the tool. One way of accomplishing this is shown in Swanson et al U.S. Pat. No. 3,136,217 wherein a flanged tool adapter has parts carried on the shank of the tool adapter which can closely engage the spindle taper and with the tool adapter flange engaged against a relatively large diameter support on the spindle. The structure disclosed in the aforementioned patent results in some sacrifice in rigidity of the tool adapter, a relatively expensive special structure associated with the adapter, and a large flange on the spindle which may not be extended into relatively small cavities.

SUMMARY

A primary feature of the invention disclosed herein is to provide a machine tool which provides a complete fit between the tapers of the spindle and the tool as well as fit of the backup support and the flange of the tool without any modified or additional structure associated with the tool, and without a requirement of extremely close precision tolerances in the geometric relationship of the tool flange to the taper, and without a requirement of extremely close tolerances in the machine. This facilitates interchangeability of tools in machines.

Another feature of the invention is to provide a machine tool having a spindle with an axially movable bar positionable at various positions for machining and having a taper to receive the matching taper of a tool or tool adapter and a rotatable bar carrier axially fixed in position but rotatable with the bar and provided with a surface for support of a flange of a tool or tool adapter whereby in loading of a tool or tool adapter into the spindle the flange first engages the bar carrier prior to the tapers being in closely fitting relation and then there is axial outward movement of the bar to fully seat the tapers while the tool is held in fixed position by the flange engaging the bar carrier.

An object of the invention is to provide a machine tool with means to obtain a backup relation between a flange of a tool or tool adapter as well as a close fit of a spindle taper and a matching taper associated with the tool by axial movement of the spindle resulting from reaction forces between the flange and its backup support.

Another object of the invention is to provide a machine tool of the bar type wherein the bar has axial movement to different extended positions for machining with small tools and has a retracted machining position for using a variety of tools, including large diameter or extended length tools with there being a backup support of such tools on a reasonably large diameter. The bar has a taper to receive a matching taper associated with the tool and a rotatable bar carrier surrounding the bar and fixed against axial movement but rotatable with the bar has a surface providing a backup support for a flange associated with the tool. Means interengaging between a tool and the bar provide for axially moving the bar in a direction to closely fit the tapers of the bar and the tool while the flange of the tool is held in fixed position against the surface of the bar carrier.

An additional object of the invention is to provide a machine tool of the bar type wherein releasable locking means hold the bar in a desired axial position and are released during mounting of a tool into the bar and means including both fixed stops and selectively movable stops control the axial location of the bar.

BRIEF DESCRIPTION OF THE DRAWINGS

FIG. 1B is a view, similar to FIG. 1A and showing the right-hand portion of the spindle and associated structure and at the left-hand side having a broken vertical line for matching with a similar vertical broken line at the right-hand side of FIG. 1A;

FIG. 2 is a fragmentary plan section taken generally along the line 2—2 in FIG. 1B;

FIG. 3 is a vertical section taken generally along the line 3—3 in FIG. 1A;

FIG. 6 is an elevational view with parts broken away of the spindle bar in extended position and carrying a small diameter tool.

DESCRIPTION OF THE PREFERRED EMBODIMENT

Figure 1A:
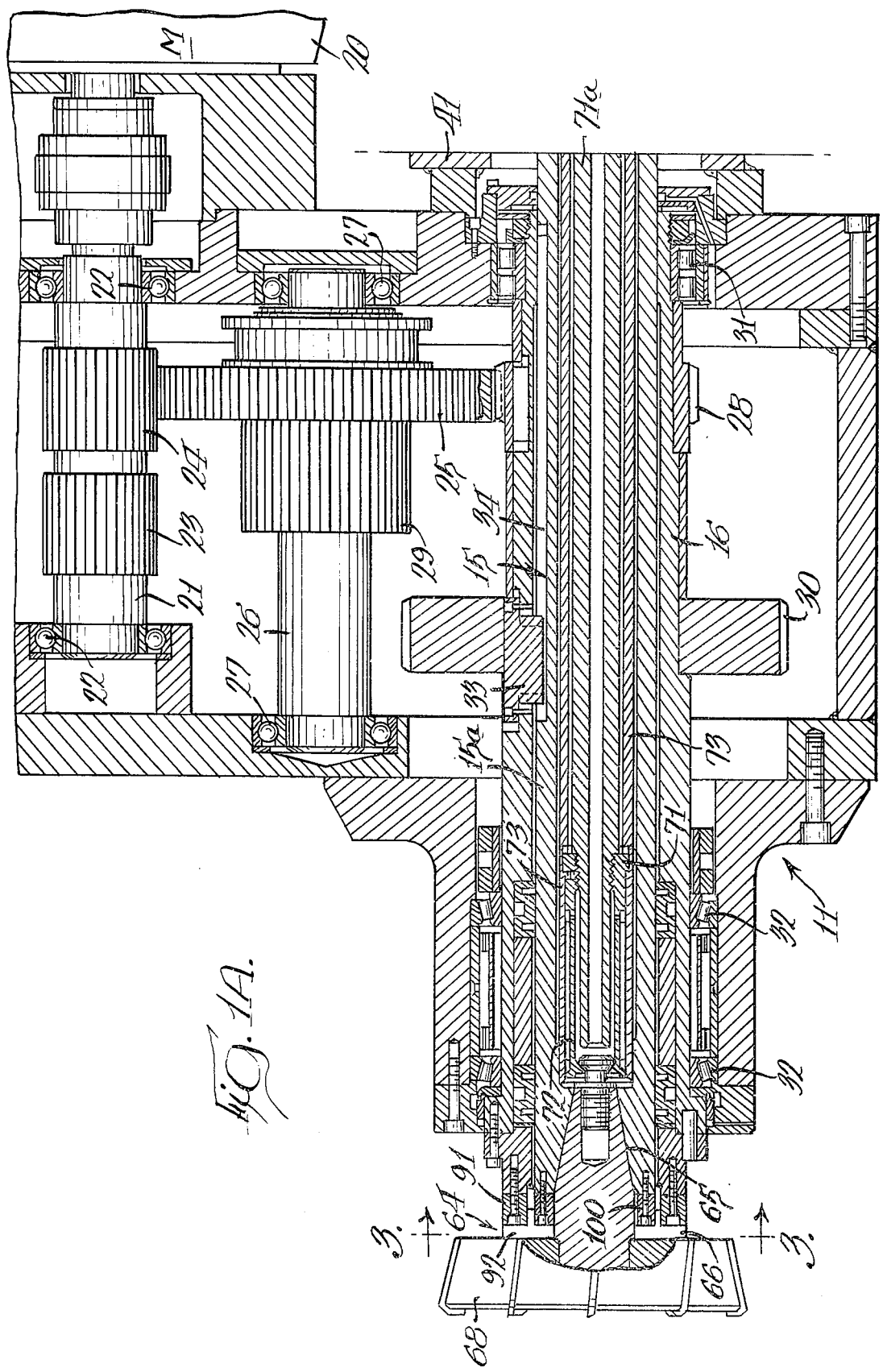
FIG. 1A is a central, vertical fragmentary section of a machine tool with a head and spindle structure.

The machine tool is shown generally in FIGS. 1A and 1B, with a head, indicated generally at 11, which mounts a spindle including an axially movable and rotatable bar 15 which is surrounded for part of its length by a rotatable bar carrier 16. The drive for the spindle is from a motor 20 which drives a shaft 21 supported by bearings 22 and having a pair of gears 23 and 24 for engagement with a movable gear 25 carried on an intermediate shaft 26 rotatably mounted by bearings 27 at opposite ends thereof. Two different speed ranges are provided, with one speed range obtained by mesh of the gear 25 with a gear 28 fixed to the bar carrier 16. The other speed range is provided by shift of the gear 25 to the left, as viewed in FIG. 1A, whereby a gear 29 fixed to the gear 25 for rotation therewith meshes with a larger diameter gear 30 fixed to the bar carrier 16 and with the intermediate gear 25 meshed with the gear 23 on the shaft 21.

The bar carrier 16 is rotatably mounted by bearings 31 at its right-hand end and by tapered roller bearings 32 adjacent its outer end and as shown at the left in FIG. 1A. Rotation of the bar carrier 16 by either of the gears 28 or 30 results in rotation of the bar 15 through a drive connection including a drive key 33 extending inwardly from the interior of the bar carrier into drive relation with an elongate drive slot 34 on the exterior of the bar 15. The drive connection causes simultaneous rotation of the bar and bar carrier while permitting axial movement of the bar 15 relative to the bar carrier 16.

The bar 15 is comprised of two parts 15a and 15b, with the parts being interconnected by a block 35 (FIG. 1B) secured to the left-hand end of the bar part 15b by attachment means 36 and carrying a series of bearings 37 with their inner races attached to the bar part 15a whereby the bar parts 15a and 15b are rigidly interconnected for axial movement together while permitting rotational movement of the bar part 15a while the bar part 15b is held against rotational movement.

The bar 15 is moved axially by a motor in the form of a cylinder 40 fixed to a stationary part 41 of the machine tool and having a rod 42 connected to an arm 43 which is secured to the right-hand end of the spindle part 15b, as shown in FIG. 1B.

The bar 15 has several axial positions relative to the head 11 with a pair of spaced stops 44 and 45 fixed to the frame of the head 11 for coaction with parts 35 and 46 connected to the bar 15. The part 46 has an abutment member 47 in engagement with the stop 45 when the bar 15 is in fully retracted position. When an abutment member 48 on the bar part 35 engages the stop 44, the bar is in fully extended position. There can be a series of intermediate machining positions of extension of the bar 15 provided by the selectively operable stops 49, 50 and 51. Each of these stops includes a movable plunger which can be moved to the position shown for the stop 51 to be in line with the abutment member 48 and, thus, limit the extension of the bar outwardly of the head 11. Each of the movable stops 49-51 has an actuating member 52, such as a solenoid or cylinder, associated therewith for movement of the stop between the extended position, as shown for stop 51, and the retracted position of stops 49 and 50.

The machine tool has means for locking the bar 15 in the retracted position or a desired position of extension controlled by any of the stops 44, 49-51 including a clamp bushing 55 mounted in a fixed frame part 56 and surrounding the bar part 15b. This bushing is known as a Speith clamp bushing wherein delivery of fluid under pressure through a line 57 causes deforming forces on the bushing elements to tightly engage the bar part 15b and lock the bar including the part 15a against axial movement. Release of the hydraulic forces releases the deformable bushing elements to free the bar for axial movement.

Figure 4:
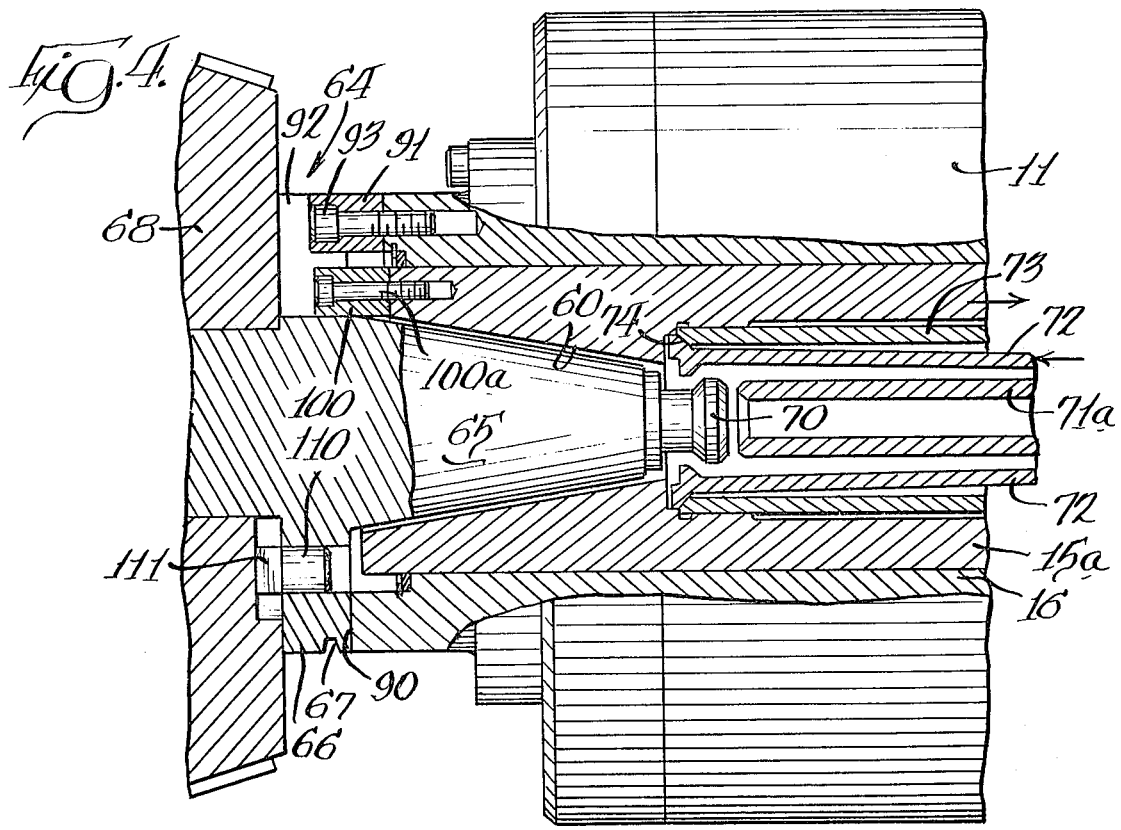
FIG. 4 is a section through the spindle and a tool taken generally along the line 4—4 in FIG. 3, wth parts broken away, showing a tool and tool adapter in initially-inserted position within the spindle.
Figure 5:
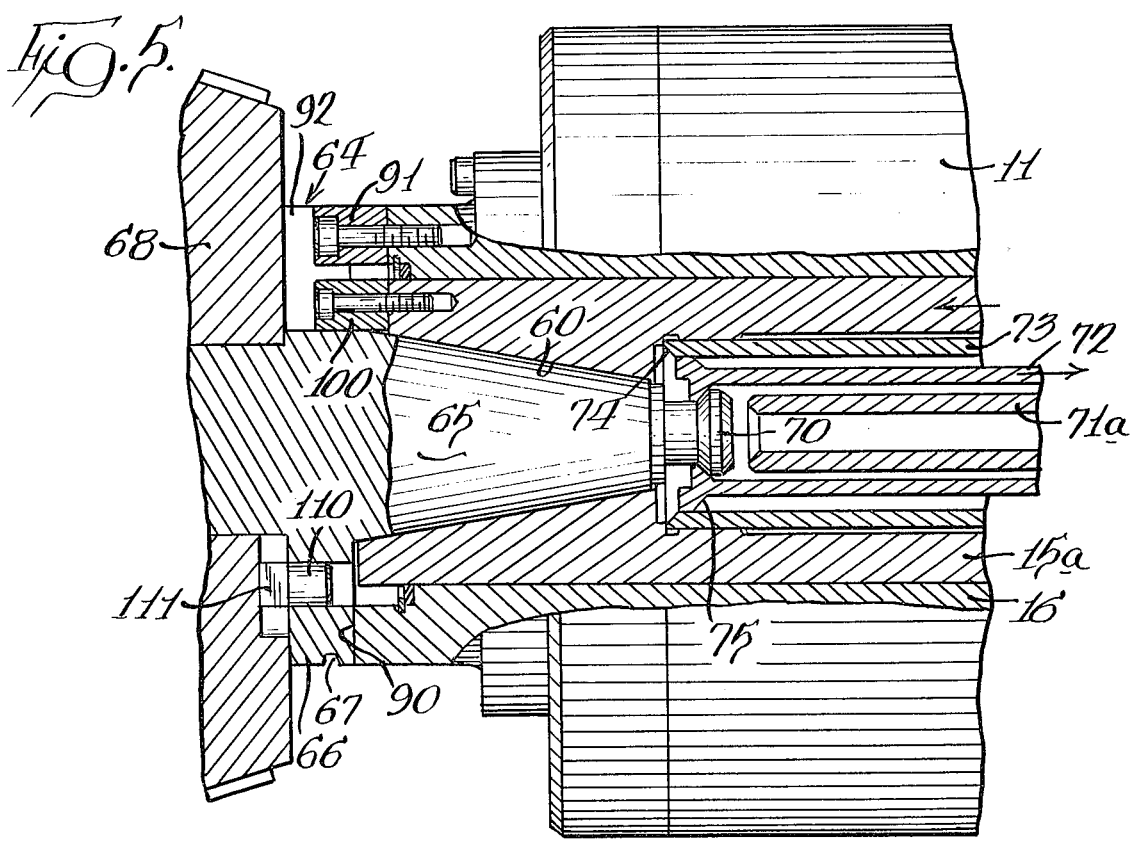
FIG. 5 is a view, similar to FIG. 4, showing final positioning of the spindle parts with the tool and tool adapter.

Referring to FIGS. 1A, 4 and 5, the outer end of the bar 15 is provided with a tapered opening 60, commonly referred to as an NMTBA taper to receive a matching taper on a tool to hold the tool for rotation with the bar and provide a concentric relation therebetween. This matching taper can be provided directly on the tool or, as shown in the drawings, on a tool adapter, indicated generally at 64, having a taper on a part 65 thereof. The adapter 64 has a cylindrical flange 66 with a peripheral groove 67 for handling in an automatic tool changer, as known in the art. The flange 66 provides backup support for a tool, such as a relatively large diameter cutter 68, fixed to the adapter 64. The features of the invention disclosed herein are usable with a tool having the taper and a flange or with a tool adapter having this structure and reference herein to a tool is intended to broadly cover either type of structure.

The inner end of the adapter 64 has a button 70 for coaction with structure mounted within the bar 15 to effect seating of the tapers. A structure of this general type to be described is generally of the type disclosed in Erikson U.S. Pat. No. 3,242,819, owned by the assignee of this application. A collet 71 with a plurality of spring fingers 72 at an end thereof is mounted within the bar 15 for movement axially thereof. A sleeve 73 fixed to the bar 15 surrounds the collet fingers 72 and has a cam surface 74 at an end thereof which coacts with cam surfaces 75 on the outer faces of said fingers to move the collet fingers 72 from a retracted position, shown in FIG. 4, to an active position, shown in FIG. 5, wherein the collet fingers engage behind the button 70. This camming movement results from movement of the collet 71 toward the right, as viewed in FIGs. 4 and 5, with there being relative movement between the collet and the bar 15. The collet 71 is normally urged to the position shown in FIG. 5 by a series of Belleville springs 80 which act between a plug 81 on the fixed sleeve 73 within the bar 15, as shown in FIG. 1B, and an annular spring seat 82 on an actuating rod 71a for the collet 71 engaging an annular member 83 fastened to the actuating rod. The rod 71a and collet fingers 72 are moved to the position of FIG. 4 against the action of the Belleville springs 80 by hydraulic means including a hollow piston 85 contained in bar part 15b and slidably mounted on rod 71a. The piston is stroke limited by an integral collar 86, whereby delivery of fluid under pressure against the right-hand surface of the piston 85 shifts the piston 85 to the left where it contacts annular member 83 with resulting leftward movement of the rod 71a and collet 71 and compression of the Belleville springs 80.

In mounting a tool or tool adapter with a matching taper and a flange to the spindle, the bar 15 is in fully-retracted position, with the abutment member 47 against the fixed stop 45 and the locking means 55 are released. A tool is then moved into the position shown in FIG. 4, either manually or by means of an automatic tool changer, to bring the flange 66 into abutting and supporting relation with a relatively large diameter outer face 90 of the rotatable bar carrier 16 and to make a driving engagement therebetween by fitting of drive keys 91 on the bar carrier with drive slots 92 in the adapter flange 66. This is the position shown in FIG. 4 with the collet 71 shifted to the left by force applied to the piston 85 to have the collet fingers 72 retracted. The force is then removed from the piston 85, with the result that the Belleville springs 80 are relieved from the compressive forces and urge the collet 71 toward the right, as viewed in FIGS. 4 and 5, to cause inward movement of the collet fingers 72 to engage behind the button 70 and act in a direction to move the tool toward the right, as viewed in FIGS. 4 and 5. This movement of the tool is prevented by engagement of the adpater flange 66 with the backup surface 90 of the bar carrier 16, with the result that the bar 15 moves toward the left, as viewed in FIG. 5, to bring the spindle taper 60 into close fitting relation with the matching taper 65 of the tool adapter. This action is caused by the interengaging means between the bar 15 and the tool adapter including the collet 71 and the interconnecting Belleville springs 80 and the freedom of the bar 15 to move axially. After the slight axial movement outwardly of the bar 15 to bring the tapers into close fit, the clamp bushing 55 is activated by fluid pressure through line 57 to lock the bar part 15b against axial movement which also locks the bar part 15a against such movement, but which still permits rotation of the bar part 15a with the bar carrier 16 for machining of a part by the tool 68. During such machining, added support is provided for the tool 68 by the engagement of the adapter flange 66 with the supporting surface 90 of the bar carrier 16.

The outer end of the bar carrier 16 has two slots (FIGS. 4 and 5) milled into the faced thereof to receive a pair of drive keys 91 (FIGS. 3, 4 and 5). The drive keys 91 are fastened by cap screws 93 and extend outwardly beyond the face 90.

The bar section 15a has a pair of slots (FIGS. 4 and 5) milled in its outer end to receive a pair of drive keys 100 (fastened by cap screws 100a as shown in FIGS. 3, 4 and 5) for driving relation with a flange 101 of a small tool adapter, indicated generally at 105 and as shown in FIG. 6.

Operation of the machine tool with the bar extended for machining with a small tool is shown in FIG. 6.

The tool adapter flange 66 has drive slots 92 with a radial depth sufficient to span both sets of drive keys 91 and 100, as shown in FIGS. 4 and 5. The bar drive keys 100 have a width less than the bar carrier drive keys 91 (see FIG. 3) whereby the drive keys 100 are inoperative when the bar carrier 16 is driving a large tool adapter with the flange 66.

The drive slots 92 in the adpater flange are of differing radial depths (see FIG. 3) and the inner ends of the drive keys 100 are at different distances from the rotational axis of the spindle whereby the tool adapter may only align with the drive keys 100 in one rotative position of the adapter. The small tool adapter 105, shown in FIG. 6, has its drive slots similarly constructed to coact with the radially offset drive keys 100 and, thus, assure mounting in only one rotative position.

As shown in FIGS. 3–5, the large diameter tool 68 is interconnected with the flange 66 of the adapter by pins having a round section 110 fitted in the flange and a square head 111 fitted in key slots in the tool 68.

I claim:

1. A machine tool having a spindle with a taper to receive a matching taper on a flanged tool adapter, rotatable support means for engagement by the adapter flange to hold the adapter in a fixed position and provide support for the tool during machining, an axially movable spindle part having said spindle taper, means interengaging the tool adapter and spindle part to move the matching taper of the adapter into a complete fit with the spindle taper by axial movement of the spindle part toward the adapter while the adapter is held in said fixed position, and means for locking the spindle part against axial movement during machining.

2. A machine tool having a head with a rotatable tool support, means mounting said tool support within the head for axial movement, means for releasably locking said tool support against said axial movement, means at an end of said tool support defining a taper to receive a matching taper on a tool for locating a tool concentric with the tool support and with a flange portion of said tool at a fixed location relative to said head, means within the tool support reacting between the tool and rotatable tool support while the tool support is free for axial movement to draw said tool support taper and tool taper together by axial movement of said tool support relative to said head while the tool flange portion remains at said fixed location.

3. A machine tool as defined in claim 2 wherein said rotatable tool support is a bar, a bar carrier surrounding said bar and rotatable therewith but held against axial movement relative to said head, and an end of said bar carrier positioned for engagement with the flange portion of said tool for holding said tool at said fixed location relative to said head.

4. A machine tool as defined in claim 3 wherein said tool taper and tool flange portion are provided by a tool adapter carrying the tool, and said adapter flange portion and bar carrier end have an interfitting drive connection defined by a key and slot.

5. A machine tool having a head with a rotatable spindle including a bar extendible outwardly of the head by axial movement thereof, said bar having a taper to receive a matching taper on a tool, a bar carrier surrounding said bar and rotatable in said head, means for rotating the bar carrier and a sliding drive connection between the bar carrier and the bar for causing rotation of the bar, means for extending and retracting said bar by axial movement thereof, a tool-engaging collet within said bar and engageable with an end of a tool positioned within the bar, means interconnected between said collet and bar for urging said collet inwardly of the bar to cause relative movement of the tool inwardly of the bar, and a flange portion of the tool engaging an exposed end of the bar carrier with the bar fully retracted whereby inward urging of the collet results in outward axial movement of the bar away from the fully retracted position to obtain a close fit of said tapers and with support of the tool by said bar carrier, and means for locking said bar against axial movement during machining.

6. A machine tool as defined in claim 5 wherein said bar carrier and tool have a driving key and slot interconnection.

7. A machine tool as defined in claim 6 wherein said tool includes a tool adapter having said taper and said flange portion.

8. A machine tool as defined in claim 5 wherein said interconnecting means between the collet and bar includes a rod connected to said collet and spring means acting between said bar and rod to urge the collet inwardly of the bar, and selectively operable means acting between said rod and bar to compress said spring means and move the collet in a direction outwardly of the bar.

9. A machine tool as defined in claim 5 wherein said bar has inner and outer parts interconnected by bearings for relative rotation, and said bar locking means includes a hydraulically operated clamp bushing engageable with said bar inner part.

10. A machine tool having a head with a rotatable spindle including an axially movable tool-carrying bar which is movable between fully retracted and fully extended positions, motor means connected between the head and bar for causing axial movement of the bar, a pair of spaced stops of said head and means on said bar engageable with the respective spaced stops for setting said fully retracted and fully extended positions, a series of movable stops between said spaced stops for setting an extended position of the bar short of the fully extended position, means for positioning any one of said movable stops in the path of said means on the bar, and means for locking said bar in the position established by a movable stop or in fully extended position.

11. A machine tool as defined in claim 10 wherein said bar is comprised of two relatively rotatable parts whereby one part may be locked by said locking means and the other part which carries a tool is free to rotate.

12. In a machine tool head, a rotatable bar carrier, a spindle bar mounted in the bar carrier for rotation with the carrier and axial movement relative to the carrier, said bar having a taper to receive a matching taper on a tool, means for rotating the bar carrier and a sliding drive connected between the bar carrier and the bar for causing rotation of the bar, means for extending and retracting said bar axially in the carrier, a tool-engaging collet within said bar and engageable with an end of a tool positioned within the bar, means connected between the collet and the bar for urging the collet inwardly of the bar to hold the tool in the bar, means for locking said bar against axial movement in the carrier during machining, a driving key on the end of the bar for engaging a flange on a relatively small tool mounted in the bar, and a driving key on the end of the carrier for engaging a flange on a relatively large tool mounted in the bar.

13. A machine tool head as defined in claim 12 wherein said bar has a retracted position and a fully extended position defined by a pair of spaced stops on said head engageable by means carried by said bar, and a plurality of retractable stops intermediate said spaced stops for setting a position of bar extension short of the fully-extended position.

* * * * *